United States Patent
Linzmeier et al.

(10) Patent No.: US 6,980,143 B2
(45) Date of Patent: Dec. 27, 2005

(54) SCALABLE ENCODER AND DECODER FOR SCALED STREAM

(75) Inventors: Karsten Linzmeier, Erlangen (DE); Nikolaus Rettelbach, Erlangen (DE); Eric Allamanche, Nuremberg (DE); Bernhard Grill, Lauf (DE)

(73) Assignee: Fraunhofer-Gesellschaft zur Foerderung der angewandten Forschung ev, Munich (DE)

( * ) Notice: Subject to any disclaimer, the term of this patent is extended or adjusted under 35 U.S.C. 154(b) by 0 days.

(21) Appl. No.: 10/500,942

(22) PCT Filed: Dec. 11, 2002

(86) PCT No.: PCT/EP02/14079

§ 371 (c)(1),
(2), (4) Date: Jul. 6, 2004

(87) PCT Pub. No.: WO03/058605

PCT Pub. Date: Jul. 17, 2003

(65) Prior Publication Data

US 2005/0017879 A1    Jan. 27, 2005

(30) Foreign Application Priority Data

Jan. 10, 2002  (DE) ................. 102 00 653

(51) Int. Cl.[7] .............................. H03M 3/00
(52) U.S. Cl. ................ 341/143; 375/259; 375/295
(58) Field of Search ................. 341/143, 141, 341/138, 76; 375/295, 265, 262, 285; 704/200.1, 704/205, 230

(56) References Cited

U.S. PATENT DOCUMENTS

| | | | |
|---|---|---|---|
| 3,921,204 A * | 11/1975 | Thompson | 375/240.25 |
| 5,425,050 A * | 6/1995 | Schreiber et al. | 375/141 |
| 6,640,209 B1 * | 10/2003 | Das | 704/219 |
| 2004/0267542 A1 * | 12/2004 | Absar et al. | 704/500 |

FOREIGN PATENT DOCUMENTS

| | | | |
|---|---|---|---|
| EP | 846 375 | 8/1999 | H04B 1/66 |
| EP | 869 622 | 9/2000 | H04B 1/66 |
| WO | WO97/14229 A | 4/1997 | |

OTHER PUBLICATIONS

Koishida, K. et al.; A 16-kbit/s Bandwidth Scalable Audio Coder Based on the G.729 Standard; 2000; IEEE, no month.
Skowronski, J.; A nonlinear transform for subband image coding; 1999; Elsevier ScienceB.V., no month.

* cited by examiner

Primary Examiner—John B Nguyen
(74) Attorney, Agent, or Firm—Michael A. Glenn; Glenn Patent Group

(57) ABSTRACT

A scalable encoder having a first encoder, a decoder and a second encoder includes, above that, a phase distorter to reduce a non-linear frequency-dependent phase distortion introduced by the first encoder or by the decoder, which results in an increased difference signal of a comparator. Thus, a difference signal with less energy is obtained that the second encoder can encode with less bits, that is with a higher bit efficiency.

12 Claims, 2 Drawing Sheets

SCALABLE ENCODER AND DECODER FOR SCALED STREAM

CROSS-REFERENCE TO RELATED APPLICATION

This application is a continuation of copending International Application No. PCT/EP02/14079, filed Dec. 11, 2002, which designated the United States and was not published in English.

BACKGROUND OF THE INVENTION

1. Field of the Invention

The present invention relates to the encoding and decoding, respectively, of information signals and in particular to scalable encoders and scalable decoders, respectively.

2. Description of the Prior Art

Scalable encoders are shown in EP-0 846 375 B1. Scalability is generally understood as the possibility to decode a subset of a bitstream representing an encoded data signal, such as an audio signal or a video signal, into a useful signal. This property is particularly desirable when, for example, a data transmission channel does not provide the required full bandwidth for a transmission of a full bitstream. On the other hand, an incomplete decoding on a decoder with lower complexity and thus reduced costs is possible. Generally, various discrete scalability layers are defined in practice.

FIG. 4 shows the basic structure of a scalable encoder. An information signal, such as an audio signal and/or a video signal, is provided at an input 100. A first encoder 102 encodes the input signal to generate a first scaling layer at an output 103 of the first encoder 102. The encoded signal of the first encoder is further made available to a first decoder 104, which is formed to reverse the encoding in order to obtain an encoded/decoded information signal at the output of the first decoder 104. Optionally, as illustrated by the dashed border of a block 106, the encoded/decoded information signal can be converted into a spectral representation, for example, by means of an MDCT (MDCT=modified discrete cosine transform). A dashed detour line 108 in FIG. 4 indicates that the encoded/decoded input signal can also be provided directly to a comparator 110. The comparator 100 includes a first input 110a and a second input 110b. The information signal is also fed into the second input 110b, a detour line 112 being used if the detour line 108 was also active in the first branch. However, if a spectral representation is fed into the first input 110a, the information signal is also converted into a spectral representation by means of, for example, an MDCT 114 so that the same conditions are present at both inputs 110a, 110b of the comparator 110.

First, the comparator 110 forms a difference between the signal at the first input 110a and at the second input 110b and then compares whether the difference between the signals at the two inputs can be encoded better than the original information signal and the converted information signal at the second input 110b, respectively. If this is the case, it is more favorable to encode the difference signal in a second encoder 114 to obtain a second scaling layer at an output 116 of the second encoder. However, if it turns out that the difference signal needs more bits for encoding than the original signal, then processing the difference signal in the second encoder would lead to the fact that a worse encoding efficiency than absolutely necessary is obtained. For this reason, the information signal is directly passed through to the second encoder 114 in this latter case.

In the art, the mode of operation of the scalable encoder of FIG. 4, wherein in the second encoder the difference signal is encoded between the encoded/decoded information signal and the original information signal is referred to as difference operation. The mode of operation wherein the difference signal is less favorable at encoding than the actual original information signal is referred to as simulcast operation. A simulcast operation is required, for example, when the information signal has highly transient properties and the first encoder is not suitable for transient signal properties, so that a very large encoding error is produced which can lead to the fact that the difference signal that the comparator 110 determines needs more bits for encoding than the original information signal.

Such a scalable encoder as shown in FIG. 4 is, for example, defined in the MPEG-4-standard (ISO/IEC 14496-3:1999 subpart 4). For example, an MPEG CELP encoder can be used as first encoder or core encoder. The second encoder is an AAC encoder providing a high-quality audio encoding and being defined in the standard MPEG-2 AAC (ISO/IEC 13818). If the first encoder 102 is a CELP encoder, a downsampling stage is provided before the first encoder and an upsampling stage is provided after the first encoder. Further, a stage 105 with variable delay may be provided in the second branch, both prior to the first encoder and prior to the MDCT block 114 to delay time signals, so that the delay introduced by the first encoder and the first decoder is compensated so that signals corresponding to each other are compared at the first input 110a and at the second input 110b in the comparator.

The downsampling stage prior to the first encoder and the upsampling stage after the first decoder in the case of a CELP-encoder as core encoder serve to adjust the sampling rate of the information signal at the input 100 to the sampling rate required by the CELP encoder and vice versa.

Both the first scaling layer and the output 103 of the first encoder and the second scaling layer at the output 116 of the second encoder are fed to a bitstream multiplexer (not shown in FIG. 4) writing a bitstream according to a format that is also specified in the MPEG 4 standard.

It will be appreciated that the scalability does not only work for two scaling layers but that in principle any number of scaling layers may be provided, wherein an individual encoder must be present for each scaling layer in the encoder and wherein other comparators are further provided, which form a difference from two "channels" to be compared, in order to provide input signals to a encoder for a next higher scaling layer.

The decoder for decoding a scalded data stream first includes a bitstream demultiplexer to extract the first scaling layer and to further extract the second scaling layer. The first scaling layer is fed into the first decoder to obtain a decoded first scaling layer. The second scaling layer is fed into a second decoder to obtain a second decoded scaling layer. Depending on the implementation, the two decoded scaling layers can then either be combined in the time domain or in the frequency domain to obtain a decoded audio signal, which further has to be converted into the time domain to provide a time-decoded information signal when the combination is performed in the frequency domain.

Depending on the delay between the first decoder and the second decoder, delay stages are also provided in the decoder so that corresponding signals can be combined by the combiner.

In principle, any encoder can be employed as first encoder. This is a substantial feature and substantial advantage, respectively, for the concept of the scalable encoder, which is versatile in that the different encoder can be selected independently from one another, because the relation between them is established by the comparator. Thus, different encoders exist, which can be employed as first encoder which involves filtering the input signal. A simple voice encoder, processing, for example, only a bandwidth of 0 to 4 kHz can comprise a low-pass on the input side allowing only frequency portions of the information signal between 0 and 4 kHz to pass. Further, various encoders require a high-pass filter ensuring that no d.c. components of the information signal are fed into the encoder. Thus, the high-pass filter has a very low cutoff frequency, which is adapted for not allowing the d.c. component to pass, but for allowing the entire rest of the spectral content of the information signal to pass the filter, or for allowing spectral components above, for example, 20 Hz to pass the input high-pass filter in the case of an audio signal.

Filterings with a frequency-selective filter can introduce a non-linear frequency-dependent phase shift in the pass band of the filter. Thus, in the ideal case, the filter leaves the magnitude of the signal in the pass band untouched. However, each filter has a frequency response with respect to the phase. As is known, an exemplary first-order low-pass filter has a phase response in that d.c. components are almost not phase-shifted, but that frequency components of the information signal are shifted towards higher frequencies towards negative phases to be phase shifted by −45° at the cutoff frequency of the low-pass filter and to be phase shifted by up to −90° in the reject band of the low-pass filter. Thus, generally speaking, various encoders, which can, in principle, be employed as first encoder include filters and other components, respectively, which introduce a non-linear frequency-dependent phase shift into the information signal processed by the first encoder.

When looking at FIG. 4, it can be seen that in the case where the first encoder involves a non-linear frequency-dependent phase shift, signals corresponding to each other with regard to time are compared in the comparator, if respective time-delay stages exist, but that the signal fed at the first input 110a is non-linear and frequency-dependent phase-shifted in comparison to the signal fed in at the second input 110b. This phase shift shows in that the difference signal, which the comparator 110 calculates, is increased, because in the other branch, i.e. the branch connected to the second input 110b, there is no or very likely a different frequency-dependent phase shift.

Thus, the difference signal is greater than it actually should be, which basically decreases the total encoding efficiency since the second encoder 114 typically requires more bits for encoding a signal having more energy. In particular, the comparator will trigger a simulcast operation more often due to the increased difference signal, which is not advantageous for encoding efficiency reasons. Even if no simulcast operation is trigged, since the difference signal is still smaller than the information signal itself, the difference signal is still more bit-intensive in encoding than it actually should be.

SUMMARY OF THE INVENTION

It is the object of the present invention to provide a more efficient concept of scalable encoding/decoding.

In accordance with a first aspect, the present invention provides a scalable encoder for encoding an information signal, having a first encoder for generating a first scaling layer from the information signal; a decoder, which is formed to decode the first scaling layer to generate an encoded/decoded information signal, wherein a non-linear frequency-dependent phase distortion is introduced by the first encoder or the decoder, by which the encoded/decoded information is phase distorted with respect to the information signal; a comparator having two inputs, wherein the comparator is formed to form a difference signal from a signal that can be applied to the first input and a signal that can be applied to the second input, wherein the difference signal can be provided to a second encoder for generating a second scaling layer; and a phase distorter for phase distorting with a non-linear frequency-dependent phase distortion which is selected such that a phase difference between the signal that can be applied to the first input and the signal that can be applied to the second input is smaller than the non-linear frequency-dependent phase distortion that is introduced due to the first encoder or the decoder, wherein the signal that can be applied to the first input is derived from an output signal of the first encoder and wherein the signal that can be applied to the second input is the information signal or a signal derived from the information signal.

In accordance with a second aspect, the present invention provides a method for encoding an information signal, comprising encoding the information signal to generate a first scaling layer; decoding the first scaling layer to generate an encoded/decoded information signal, wherein by the step of encoding or the step of decoding a non-linear frequency-dependent phase distortion is introduced, by which the encoded/decoded information signal is phased distorted with respect to the information signal; forming a difference signal from a first signal and a second signal, wherein the difference signal can be encoded for generating a second scaling layer; and phase-distorting with a non-linear frequency-dependent phase distortion, which is selected such that a phase difference between the first signal and the second signal is smaller than the non-linear frequency-dependent phase distortion that is introduced due to the step of encoding or the step of decoding, wherein the first signal is derived from an output signal generated in the step of encoding, and wherein the second signal is the information signal or a signal derived from the information signal.

In accordance with a third aspect, the present invention provides a decoder for a data stream having a first scaling layer and a second scaling layer, having a first decoder for decoding the first scaling layer to obtain a decoded first scaling layer; a second decoder for decoding the second scaling layer to obtain a decoded second scaling layer; a phase distorter for phase-distorting the decoded first scaling layer according to a phase response, which is non-linear versus the frequency, wherein the phase response is selected such that a non-linear frequency-dependent phase distortion present in the decoded first scaling layer is reduced with respect to the decoded second scaling layer, to obtain a phase-distorted decoded first scaling layer; and a combiner for combining the phase distorted decoded first scaling layer and the decoded second scaling layer to obtain a decoded information signal.

In accordance with a fourth aspect, the present invention provides a method for decoding for a data stream having a first scaling layer and a second scaling layer, comprising decoding the first scaling layer to obtain a decoded first scaling layer; decoding the second scaling layer to obtain a decoded second scaling layer; phase distorting the decoded first scaling layer according to a phase response that is non-linear versus the frequency, wherein the phase response is selected such that a non-linear frequency-dependent phase shift present in the decoded first scaling layer is reduced with respect to the decoded second scaling layer to obtain a phase distorted decoded first scaling layer; and combining the phase-distorted decoded first scaling layer and the decoded second scaling layer to obtain a decoded information signal.

The present invention is based on the knowledge that either the input signal into the first input of the comparator or the input signal into the second input of the comparator or both input signals into the comparator have to be post-processed via a means for phase shifting so that the two signals have a total phase difference, which is smaller than the non-linear frequency-dependent phase shift introduced by the first encoder. Ideally, the means for phase shifting is implemented such that the two input signals into the comparator substantially have no phase difference versus the frequency but are substantially in-phase versus all frequencies of interest. This case provides the smallest possible difference signal and thus the highest encoding efficiency. Even if the means for phase shifting is, however, designed to merely reduce the frequency-dependent phase shift introduced by the first encoder, generally, an increase of encoding efficiency will already be obtained since the energy of the difference signal decreases with decreasing phase shift between the two signals of which the difference is formed.

In the first embodiment of the present invention, a phase shifter is introduced in the branch in which the first encoder and the first decoder are located, which has an effect on the encoded/decoded information signal either with regard to time or on the spectral representation in order to compensate the phase shift introduced by the first encoder and eventually by the first decoder. In this embodiment, a corresponding phase shifter must be provided in the decoder for a scalable data stream.

In the second embodiment of the present invention, no decoder modifications are required. This is achieved by the fact that not the signal in the first branch, i.e. the encoded/decoded information signal, is non-linear phase-shifted, but that the original audio signal in the second branch, which is fed into the second input of the comparator either in its temporal representation or in its spectral representations, is phase distorted, namely preferably phase-distorted in the same way as the signal in the first branch, so that at both inputs of the comparator the same phase conditions exists again. In this case, no decoder modification must be performed, since such frequency-dependent phase distortions are usually not audible for the human ear and are almost inaudible, respectively.

Alternatively, phase shifters may be provided in both branches, which act together on the corresponding signals to generate equal phase conditions at the inputs of the comparator by subjecting two non-phase-distorted signals to a subtraction or by subjecting two signals equally non-linear phase-distorted versus the frequency to a subtraction.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
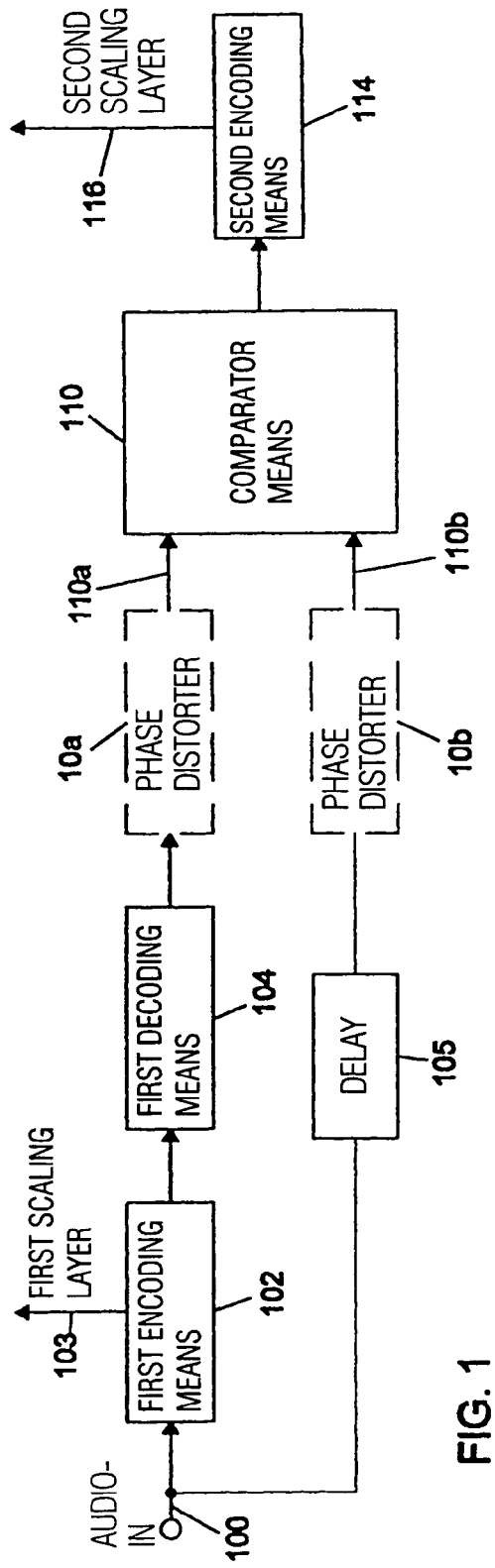
FIG. 1 is a block diagram of a scalable encoder according to the present invention.

Reference will be made below to FIG. 1 to illustrate a block diagram of an inventive scalable encoder. The scalable encoder in FIG. 1 comprises a means for phase distorting, which may comprise a phase distorter 10a or a phase distorter 10b. In a first embodiment of the present invention, the phase distorter 10a is formed to compensate for a non-linear frequency-dependent phase distortion introduced by the first encoder or first decoder. Such a non-linear frequency-dependent phase distortion is generated, for example, by a low-pass filter, a high-pass filter, a band pass filter etc.

The phase distorter 10a may be realized by an all-pass filter whose amplitude response versus the frequency is constant at least in the frequency domain of interest and whose phase response is designed such that the non-linear frequency-dependent distortion introduced by the first encoder or the first decoder together with the phase response of the all-pass filter (phase distorter 10a) is optimally equal 0 for all frequencies of interest. In this case, the optimum difference signal is generated, i.e. the difference signal having the least energy at the output of the comparator 110, which can be encoded by the second encoder with the least possible number of bits. However, an enhancement of the encoding efficiency would already be achieved in that the phase shift versus the frequency, considered between the first input signal being fed into the input 110a and the second input signal being fed into the second input 110b of means 110 is smaller than the phase shift and phase distortion, respectively, introduced by the first encoder or the first decoder.

In an alternative embodiment of the present invention, the phase distorter 10a is not present, but merely the phase distorter 10b is present to subject the signal to be fed into the second input 110b of the comparator 110 to a phase distortion. In the optimum case, the phase response of the phase distorter 10b is selected such that it is exactly equal to the phase response effected by the first encoder or the first decoder. In other words, this means that also the information signal itself, which has to be fed into the second input 110b of the comparator 110 is, if possible, phase distorted in the same way as the signal in the upper branch of FIG. 1, i.e. the signal that is fed into the first input 110a of the comparator 110. However, it should be noted that an enhancement of encoding efficiency is already achieved when the phase distorter 10b does not have exactly the optimum characteristic but introduces at least such a non-linear frequency-dependent phase distortion that the phase difference between the input signals into the comparator 110 is smaller than the introduced non-linear frequency-dependent phase distortion due to the first encoder 102 and/or the first decoder 104.

In an alternative embodiment of the present invention, both the first phase distorter 10a and the second phase distorter 10b are effective to effect together that the phase difference, which the signals to be fed into the comparator 110 have, is smaller than the non-linear frequency-dependent phase distortion that is introduced by the first encoder 102 and/or the first decoder 104.

If it is assumed that the information signal fed into the input 100 of FIG. 1 is a time signal, no conversion into the frequency domain occurs prior to the comparator if the first encoder 110 is also an encoder operating in the time domain. In this case, the first phase distorter 10a and/or the second phase distorter 10b operates in the time domain. As has been explained, both the first phase distorter 10a and the second phase distorter 10b can be constructed as all-pass filter and, in particular, as digital filter having the desired characteristic, which is unproblematic in so far as the information signal 100 at the input, which is, for example, a discrete audio signal, exists already in digital form. If this is not the case, an analog-digital-conversion has to be performed at some location prior to the all-pass filter (10a, 10b).

However, as is known, all-pass filters can also be constructed in an analogous way by respective combinations of LC filters, as is known in the field of filter synthesis.

Figure 2:
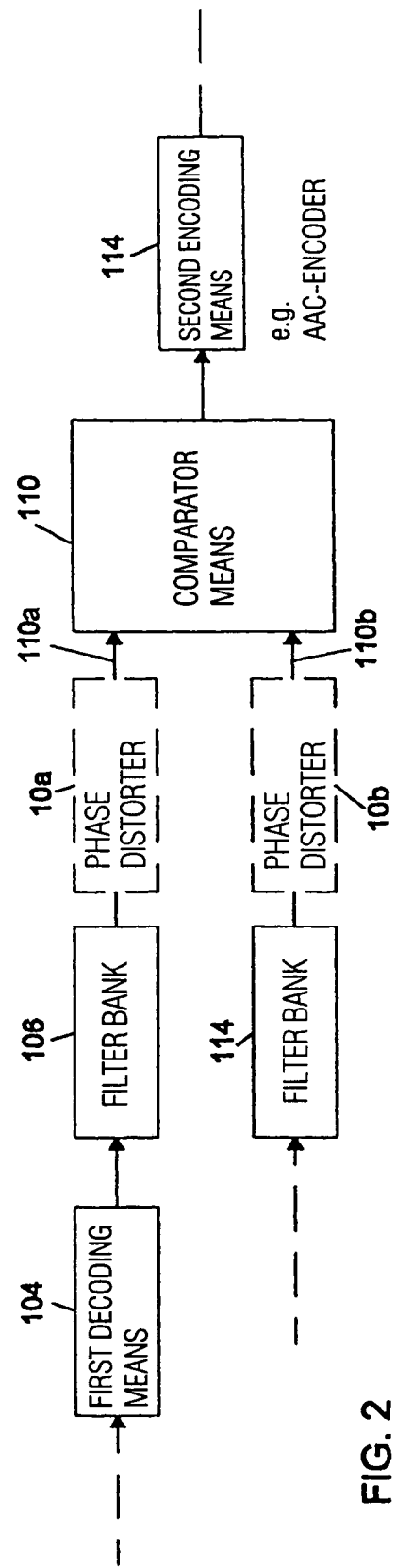
FIG. 2 is a partial view of a scalable encoder, in which the phase shift and phase distortion, respectively, is carried out in the frequency domain.

Alternatively, as is shown in FIG. 2, a conversion into a spectral representation in both branches can be achieved by means of filterbank (106, 114), for example, and the phase distorter 10a and 10b, respectively, can operate in the frequency domain, i.e. can act on spectral lines. This embodiment enables a direct influencing of the spectral lines. The influencing magnitudes of the spectral lines for realizing respective phase distortions can be obtained by detecting the non-linear frequency-dependent phase distortion caused by the first encoder and/or the first decoder by means of a measurement technique and storing it, for example, in a table. Therefrom it can be seen that the phase distorters 10a, 10b do not necessarily have to be implemented as analog or digital filters but also by means of a calculating unit or software.

Further, it should be noted that the non-linear frequency-dependent phase distortion introduced, for example, by the phase distorter 10b does not necessarily have to be introduced after the time delay 105 but can as well be impressed beforehand on the signal to be fed into the second input 110b of the comparator. The same applies for the phase distorter 10a. If possible, the same can also be placed at another location in the upper branch of FIG. 1. The key factor is that a signal to be fed into the first input 110a of the comparator 120 and a signal to be fed into the second input 110b of the comparator 110 are "phase-treated" such that their phase difference versus the frequency is smaller than the phase difference introduced by the first encoder 102 and/or the first decoder 104. Thus, a difference signal results, which is already smaller than in the case of a non-existing non-linear frequency-dependent phase distortion, which directly results in a better encoding efficiency, i.e. in a smaller number of bits for representing a given information signal.

As has already been explained, no decoder modification will be required in the case where the phase distorter 10b is provided in the lower branch of FIG. 1. If, however, the solution is chosen that the phase distorter 10a is present in the upper branch of FIG. 1, a corresponding modification in the decoder is required, which will be explained below with reference to FIG. 3.

A decoder for a scaled data stream includes a data stream demultiplexer 30 to extract a first scaling layer 34 and a second scaling layer 36, and, if necessary, further scaling layers from a scaled data stream 32.

The first scaling layer is fed into a first decoder 38, the first decoder being arranged to be able to decode a signal supplied by the first encoder (102 in FIG. 1).

Analogous thereto, the second scaling layer is fed into a second decoder 40, which is arranged to decode a signal output by a second encoder (114 in FIG. 1).

Figure 3:
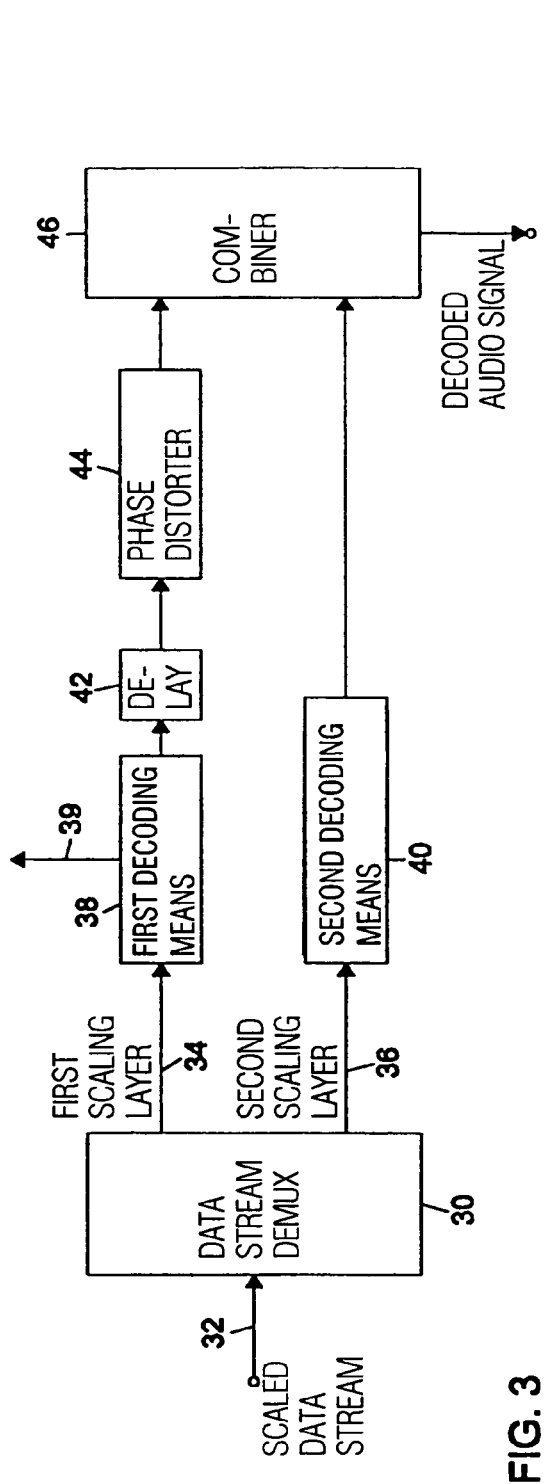
FIG. 3 is a block diagram of a decoder according to the invention for scaled data streams.
Figure 4:
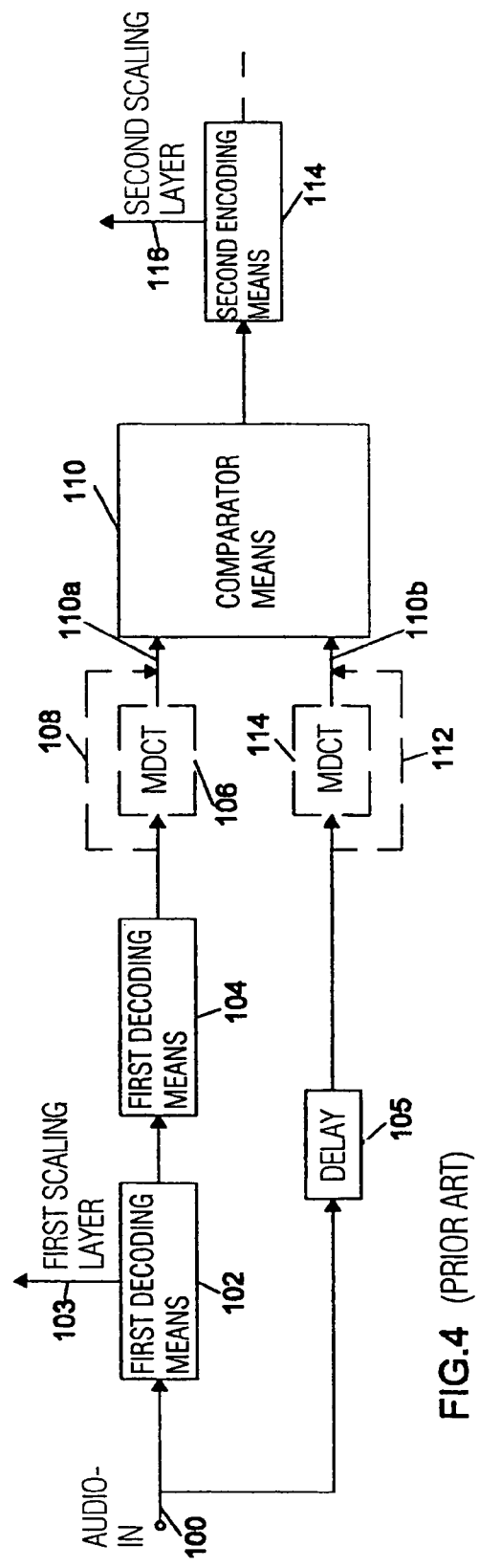
FIG. 4 shows a known scalable encoder.

As the first decoder typically generates less delay than the second decoder, a constant time delay is further required, which is represented by a delay member 42 in FIG. 3.

The delayed first scaling layer is then fed into a phase distorter 44 to introduce a non-linear frequency-dependent phase distortion identical to the phase distortion that has been introduced by the phase distorter 10a of FIG. 1. Thus, the phase distorters 44 and 10a can be implemented with the same phase response versus the frequency.

The output signal of the phase distorter 44 is then fed into a combiner 46, as is the output signal of the second decoder. The combiner adds the two signals to yield a decoded audio signal when the comparator 110 in the decoder has fed the difference signal between the two input signals into the comparator of the second encoder. Alternatively, the output signal of the second decoder 40 of FIG. 3 is connected through the combiner if the comparator 110 in the encoder had decided for a simulcast operation.

The first decoder 38 can have a direct output 39 to directly output its output signal to be able to quickly obtain, for example, at least a first impression of the signal encoded in the scaled data stream due to the first scaling layer, without obtaining the complete decoded audio signal and decoded information signal, respectively, with full quality at the output of the combiner 46.

Depending on the encoder implementation, a conversion into the time domain can only take place after the combiner 46. In this case the output signal of the phase distorter has to be converted into a spectral representation prior to the combiner 46. However, alternatively, the signal could also be converted into a spectral representation prior to the phase distorter, and the phase distorter would then operate in the frequency domain.

According to the invention, the phase curves of the signal portions processed in the different layers or scaling layers are matched to one another. On the one hand, this can occur by subjecting the reconstructed basis layer signal to a subsequent filtering (phase distorter 10a of FIG. 1), whose phase response in the relevant frequency domain proceeds with a reversed sign but otherwise is almost equal to the phase response of the filterings in the base layer encoder (102 of FIG. 1), so that in sum, the phase distortions almost cancel each other out. In this case, a filtering with the same phase response should take place both in the encoder and in the decoder—as far as can be realized in practice.

Alternatively, the subtraction in the comparator (110 in FIG. 1) can be performed between the reconstructed phase-distorted base layer signal and the input signal phase-distorted in the same way instead of with the non-distorted input signal. Therefore, the input signal is subjected to a filtering, which causes almost the same phase distortion as the filtering in the base layer encoder in the relevant frequency domain with a correct sign. In this case, a realization as all-pass filter for maintaining the magnitude spectrum is also favorable. As has been explained, in this case, the phase distortion has to be performed only in the scalable encoder since a compensation in the decoder is omitted due to an almost inaudibility of phase distortions for the human ear. Thus, the encoding efficiency is increased, since the difference signal no longer contains any artificially introduced phase distortions, so that, in total, a difference signal with less energy and thus with a more favorable encodeability results.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Scalable encoder for encoding an information signal, comprising:
   a first encoder for generating a first scaling layer from the information signal;
   a decoder, which is formed to decode the first scaling layer to generate an encoded/decoded information signal,
   wherein a non-linear frequency-dependent phase distortion is introduced by the first encoder or the decoder, by which the encoded/decoded information is phase distorted with respect to the information signal;
   a comparator having two inputs, wherein the comparator is formed to form a difference signal from a signal that can be applied to the first input and a signal that can be applied to the second input, wherein the difference signal can be provided to a second encoder for generating a second scaling layer; and
   a phase distorter for phase distorting with a non-linear frequency-dependent phase distortion which is selected such that a phase difference between the signal that can be applied to the first input and the signal that can be applied to the second input is smaller than the non-linear frequency-dependent phase distortion that is introduced due to the first encoder or the decoder,
   wherein the signal that can be applied to the first input is derived from an output signal of the first encoder and wherein the signal that can be applied to the second input is the information signal or a signal derived from the information signal.

2. Scalable encoder according to claim 1,
   wherein the phase distorter is disposed to phase-distort an input signal into the first encoder or an output signal of the first decoder according to a phase response, which is selected in such a way that it results in a resulting phase response with a value of substantially 0 together with a phase response of the non-linear frequency-dependent phase distortion due to the first encoder or the first decoder.

3. Scalable encoder according to claim 1,
   wherein the phase distorter is disposed to phase-distort the information signal or a signal derived from the information signal according to a phase response, which is substantially equal to the phase response of the non-linear frequency-dependent phase distortion, which can be introduced by the first encoder or the first decoder.

4. Scalable encoder according to claim 1,
   wherein the phase distorter is realized as all-pass filter having a predetermined phase response and which has substantially no influence on a magnitude of the signal to be filtered.

5. Scalable encoder according to claim 1, further comprising:
   a generator for generating a spectral representation of the encoded/decoded information signal; and
   a generator for generating a spectral representation of the information signal or of an information signal derived from the information signal.

6. Scalable encoder according to claim 5, wherein the phase distorter acts on a spectral representation.

7. Scalable encoder according to claim 1, further comprising:
   a delay element for time-delaying the information signal by a period of time, which is substantially equal to a processing time of the first encoder and the decoder.

8. Scalable encoder according to claim 1,
   wherein the first encoder is limited to a frequency band and wherein the phase distorter is only effective in the frequency band to which the first encoder is band-limited.

9. Scalable encoder according to claim 1,
   wherein the information signal comprises an audio signal and wherein the second encoder is embodied as conversion encoder.

10. Method for encoding an information signal, comprising:
    encoding the information signal to generate a first scaling layer;
    decoding the first scaling layer to generate an encoded/decoded information signal,
    wherein by the step of encoding or the step of decoding a non-linear frequency-dependent phase distortion is introduced, by which the encoded/decoded information signal is phase distorted with respect to the information signal;
    forming a difference signal from a first signal and a second signal, wherein the difference signal can be encoded for generating a second scaling layer; and
    phase-distorting with a non-linear frequency-dependent phase distortion, which is selected such that a phase difference between the first signal and the second signal is smaller than the non-linear frequency-dependent phase distortion that is introduced due to the step of encoding or the step of decoding,
    wherein the first signal is derived from an output signal generated in the step of encoding, and wherein the second signal is the information signal or a signal derived from the information signal.

11. Decoder for a data stream having a first scaling layer and a second scaling layer, comprising:
    a first decoder for decoding the first scaling layer to obtain a decoded first scaling layer;
    a second decoder for decoding the second scaling layer to obtain a decoded second scaling layer;
    a phase distorter for phase-distorting the decoded first scaling layer according to a phase response, which is non-linear versus the frequency, wherein the phase response is selected such that a non-linear frequency-dependent phase distortion present in the decoded first scaling layer is reduced with respect to the decoded second scaling layer, to obtain a phase-distorted decoded first scaling layer; and
    a combiner for combining the phase distorted decoded first scaling layer and the decoded second scaling layer to obtain a decoded information signal.

12. Method for decoding for a data stream having a first scaling layer and a second scaling layer, comprising:
    decoding the first scaling layer to obtain a decoded first scaling layer;
    decoding the second scaling layer to obtain a decoded second scaling layer;
    phase distorting the decoded first scaling layer according to a phase response that is non-linear versus the frequency, wherein the phase response is selected such that a non-linear frequency-dependent phase shift present in the decoded first scaling layer is reduced with respect to the decoded second scaling layer to obtain a phase distorted decoded first scaling layer; and
    combining the phase-distorted decoded first scaling layer and the decoded second scaling layer to obtain a decoded information signal.

* * * * *

UNITED STATES PATENT AND TRADEMARK OFFICE
CERTIFICATE OF CORRECTION

PATENT NO. : 6,980,143 B2
DATED : December 27, 2005
INVENTOR(S) : Linzmeier et al.

It is certified that error appears in the above-identified patent and that said Letters Patent is hereby corrected as shown below:

<u>Title page,</u>
Item [54], Title, replace "SCALABLE ENCODER AND DECODER FOR SCALED STREAM" with -- SCALABLE ENCODER AND DECODER FOR A SCALED DATA STREAM --.

Signed and Sealed this

Fourteenth Day of March, 2006

JON W. DUDAS
*Director of the United States Patent and Trademark Office*